(12) United States Patent
Kishi et al.

(10) Patent No.: US 7,670,131 B2
(45) Date of Patent: Mar. 2, 2010

(54) IMPRINTING JIG AND IMPRINTING APPARATUS

(75) Inventors: Hiroyuki Kishi, Ibaraki (JP); Hideaki Yamanaka, Ibaraki (JP)

(73) Assignee: Hitachi Maxell, Ltd., Ibaraki-shi, Osaka (JP)

( * ) Notice: Subject to any disclaimer, the term of this patent is extended or adjusted under 35 U.S.C. 154(b) by 0 days.

(21) Appl. No.: 12/046,791

(22) Filed: Mar. 12, 2008

(65) Prior Publication Data

US 2008/0241307 A1  Oct. 2, 2008

(30) Foreign Application Priority Data

Mar. 26, 2007 (JP) .............................. 2007-078751

(51) Int. Cl.
*B28B 13/00* (2006.01)
(52) U.S. Cl. .................... 425/436 R; 425/389; 425/385
(58) Field of Classification Search ................. 425/385, 425/389, 436 R; 264/293
See application file for complete search history.

(56) References Cited

U.S. PATENT DOCUMENTS

| 5,433,897 | A  | * | 7/1995  | Kanome et al. ............ 264/1.33 |
| 7,377,765 | B2 | * | 5/2008  | Bandic et al. ................ 425/385 |
| 2003/0189273 | A1 | * | 10/2003 | Olsson ........................ 264/293 |
| 2006/0246169 | A1 | * | 11/2006 | Chen et al. ................... 425/385 |
| 2007/0108163 | A1 | * | 5/2007  | Hattori et al. .................. 216/85 |
| 2007/0166651 | A1 | * | 7/2007  | Fujita et al. .................. 430/321 |

FOREIGN PATENT DOCUMENTS

| JP | 2003-91970 A | 3/2003 |
| JP | 2006-26928 A | 2/2006 |

\* cited by examiner

*Primary Examiner*—Maria Veronica D Ewald
(74) *Attorney, Agent, or Firm*—Birch, Stewart, Kolasch & Birch, LLP

(57) ABSTRACT

The invention provides an imprinting jig for transferring a pattern onto a thermoplastic sheet. The imprinting jig is provided with: a first die having a surface with a pattern; a die holder for supporting the first die; an elastic member placed between the first die and the die holder; and a second die opposing to the first die. The thermoplastic sheet is placed on the surface with the pattern of the first die. The imprinting jig optionally includes an adhesion reducing means between the elastic member and the first die or between the elastic member and the die holder.

2 Claims, 5 Drawing Sheets

IMPRINTING JIG AND IMPRINTING APPARATUS

BACKGROUND OF THE INVENTION (1) Field of the Invention

The invention relates to an imprinting jig for putting a thermoplastic sheet therebetween and an imprinting apparatus. Particularly it relates to the imprinting jig and apparatus used for a thermal imprinting process for transferring or printing a fine pattern onto the thermoplastic sheet by heating and applying pressure.

(2) Related Art

Professor Stephen Y. Chou et al. of, Princeton University have made a number of reports on a nano-imprinting process which prints a fine pattern having a high aspect ratio at a moderate price. The nano-imprinting process includes mainly an optical nano-imprinting process in which ultraviolet curing resin is used for printing a pattern, and a thermal nano-imprinting process in which heat and pressure are applied to a thermoplastic substance to print a pattern. Especially the latter process has been attracting attention since the process can produce flat panel displays, electronic cards and the like at a low cost since a sheet material is used (hereinafter, this process will be referred to as "sheet thermal nano-imprinting process").

In the field of recording media, attention has been paid to a technique in which an optical disk pattern is transferred onto a thin polycarbonate (PC) sheet such as an optical disk substrate through the sheet thermal nano-imprinting process, and the thin PC sheet is directly used as a recording medium, thereby recording capacity per unit volume is dramatically increased. For example, JP-A-2003-91970 proposes a mass storage record reproduction system configured to combine a thin optical disk having a thickness not greater than 100 μm with a stabilizer for stably rotating the thin optical disk with little run out of its surface.

A substrate of an optical disk is generally produced by injection molding. When the thin substrate as described above is produced by injection molding, however, resin cannot be filled in a gap between a mold and a first die (hereinafter, referred to as "stamper"), since the gap is extremely narrow. Thus, it has been technically difficult to apply the injection molding process to producing a thin substrate. In addition, the technique for patterning a thin substrate by a 2P method is expensive although it is possible to produce the thin substrate. On the contrary, the sheet thermal imprinting process, which directly print a pattern on a thin sheet substrate, is remarkably advantageous technically and in cost in relation to the conventional techniques described above.

SUMMARY OF THE INVENTION

In producing optical disks by means of the sheet thermal nano-imprinting process, a fine pattern is printed onto a thermoplastic sheet to produce an extremely thin optical disk, when the sheet is formed thin. The sheet thermal nano-imprinting process prints a fine pattern formed on a stamper onto a surface of the sheet softened by applying pressure to the sheet at a temperature higher than a glass transition temperature of the sheet. Subsequently, the sheet is cooled to a temperature lower than the glass transition temperature, and the sheet is separated from the die or stamper. A jig used therein is called "imprinting jig". The imprinting jig comprising: a first die for transferring a fine pattern (hereinafter, referred to as "stamper"); a second die (hereinafter, referred to as "plate") opposing the surface with the fine pattern of the first die (stamper); and a die holder (hereinafter, referred to as "stamper holder" or "holder plate") for supporting the first die. JP-A-2006-26928 discloses that a thermoplastic sheet is fixed in the imprinting jig including the stamper on which a predetermined fine pattern is formed, and the imprinting jig is placed between parallel plates in the pressing apparatus, and pressed while heating, since it takes time to adjust a temperature of an entire pressing apparatus in using. Subsequently, the imprinting jig is taken out from the pressing apparatus for separating the sheet from the stamper, and only the imprinting jig is cooled.

A fine pattern should be surely transferred over a wide area, such as a whole circular area of φ120 mm, for producing optical disks, and it is necessary to accurately control the degree of parallelism between the sheet and the stamper. If these are pressed in a non-parallel state, the whole sheet may not be uniformly pressed, and the pattern may not be accurately transferred onto the sheet, or the sheet may be deformed.

To avoid such problems, as described below, a rubber sheet (hereinafter, referred to as "elastic member") is positioned as a buffer between the stamper and the stamper holder for supporting the stamper. Consequently, the whole surface of the sheet can be uniformly pressed, which allows for a large area transfer.

As described below, however, the following problem has become clear through experiments by the inventors. That is, in cooling and separating step after transferring the pattern, a very large force is necessary to separate the already-transferred sheet from the stamper of the imprinting jig, when using the rubber sheet for buffering. Thus, the separated sheet may be deformed. Furthermore, if the already-transferred sheet is separated from the stamper at a tilt angle to each other, the transferred fine pattern may be damaged, and thus it is necessary to separate them while they are kept in parallel to each other. However, when the sheet is separated from the stamper while keeping them in parallel to each other, a larger force is required for separate them, compared with the case of separation by tilting them to each other. When a force necessary for separation turns large as described above, a problem arises that a large-scale separating apparatus becomes necessary.

According to a first aspect of the invention, an imprinting jig is provided comprising: a first die having a surface with a pattern for transferring the pattern onto a thermoplastic sheet; a die holder for supporting the first die; an elastic member placed between the first die and the die holder; and a second die opposing to the first die, wherein the sheet is placed on the surface with the pattern of the first die. Preferably, the second die has a mirror finished surface for contacting with the sheet. Alternatively, the second die may be formed with a pattern to be transferred on the sheet. When the second die has the mirror finished surface, the plastic sheet may be surely separated from the stamper without the plastic sheet being separated from the second die at the time of separation of the plastic sheet from the stamper, since the plastic sheet is firmly adhered to the second die.

According to a second aspect of the invention, an imprinting jig is provides, comprising: a first die having a surface with a pattern for transferring the pattern onto a thermoplastic sheet; a die holder for supporting the first die; an elastic member placed between the first die and the die holder; a second die opposing to the first die, wherein the sheet is placed on the surface with the pattern of the first die, wherein an adhesion reducing means is provided between the elastic member and the first die or between the elastic member and the die holder. Preferably, the second die has a mirror finished surface for contacting with the sheet. Alternatively, the second die may be formed with a pattern to be transferred on the sheet. When the second die has the mirror finished surface, the plastic sheet may be surely separated from the stamper without the plastic sheet being separated from the second die at the time of separation of the plastic sheet from the stamper, since the plastic sheet is firmly adhered to the second die.

Since the imprinting jig according to the invention includes the adhesion reducing means, adhesion between the elastic member and the stamper and/or between the elastic member and the stamper holder becomes low, and as the result, the stamper and the plastic sheet can be easily separated from each other. For example, after heating and pressurizing the plastic sheet between the stamper and the second die of the imprinting jig through a sheet thermal nano-imprinting process described below, the stamper and the plastic sheet are adhered to each other. Thus, a very large force becomes necessary for separating the plastic sheet from the stamper. According to the invention, the adhesion reducing means lowers the adhesion between the elastic member and the stamper and/or the elastic member and the stamper holder. Thus, at the start of separation of the plastic sheet from the stamper, the elastic member is slightly separated from the stamper holder at a portion where the elastic member is not fixed to the stamper holder (for example, the central portion of the elastic member). At this time, a portion of the elastic member which is fixed to the stamper holder (for example, a peripheral portion of the elastic member) cannot be separated from the stamper holder. Consequently, only the central portion of the elastic member is deformed to bend toward the side opposite to the stamper holder. The deformation generates a small gap between the stamper and the plastic sheet at a peripheral portion of the stamper. It is considered that the gap formed in such a manner facilitates separation of the plastic sheet from the stamper.

According to an embodiment of the invention, the elastic member may be made of silicon rubber, but the elastic member may be made of other rubber having thermal resistance. In each case, the elastic member may be made of rubber having thermal resistance (silicon rubber, fluorinated rubber and the like), and the imprinting jig can be used in a high-temperature environment necessary for the sheet thermal nano-imprinting process.

According to an embodiment of the invention, the adhesion reducing means may comprise irregularity formed on a surface of the stamper holder on the elastic member side. A height of the irregularity may be approximately 1 μm. In this case, the surface of the stamper holder is roughened so that the irregularity having a height of e.g. approximately 1 μm is formed, thereby adhesion between the stamper holder and the elastic member may be reduced, and further the plastic sheet may be easily separated from the stamper.

The term "irregularity" referred to in the description means protrusions and/or depressions, and the height of the irregularity means difference of elevation in a direction perpendicular to a surface on which the irregularity is formed (e.g. the surface of the stamper holder on the elastic member side).

According to an embodiment of the invention, the adhesion reducing means may comprise irregularity formed on a surface of the stamper holder on the elastic member side. A height of the irregularity may be approximately 1 μm. In this case, the surface of the stamper holder is roughened so that irregularity having a height of e.g. approximately 1 μm is formed, thereby adhesion between the stamper holder and the elastic member may be reduced, and further, the plastic sheet may be easily separated from the stamper.

According to an embodiment of the invention, the adhesion reducing means may comprise irregularity formed on a surface of the elastic member on the stamper side. A height of the irregularity may be approximately 1 μm. In this case, the surface of the elastic member is roughened so that irregularity having a height of e.g. approximately 1 μm is formed, thereby adhesion between the stamper holder and the elastic member may be reduced, and further, the plastic sheet may be easily separated from the stamper.

According to an embodiment of the invention, the adhesion reducing means may comprise a release agent. The adhesion reducing means may also comprise a thin film of fluorine resin between the elastic member and the stamper and/or between the elastic member and the stamper holder. The adhesion reducing means may also comprise a metallic thin film between the elastic member and the stamper holder and/or between the elastic member and the stamper, on which surface or surfaces irregularity is formed. In each case, adhesion between the stamper holder and the elastic member may be reduced, and further, the plastic sheet may be easily separated from the stamper.

According to an embodiment of the invention, a surface of the second die facing the stamper may be mirror finished. In this case, at the time of separation of the plastic sheet from the stamper, the plastic sheet may be surely separated from the stamper without the plastic sheet being separated from the second die, since the plastic sheet and the second die are firmly adhered to each other.

When a pattern is transferred onto a large area through the sheet thermal nano-imprinting process using the imprinting jig according to the invention, the sheet can be separated from the jig by exerting a comparatively small force without damaging the sheet.

DETAILED DESCRIPTION OF THE INVENTION

Figure 1:
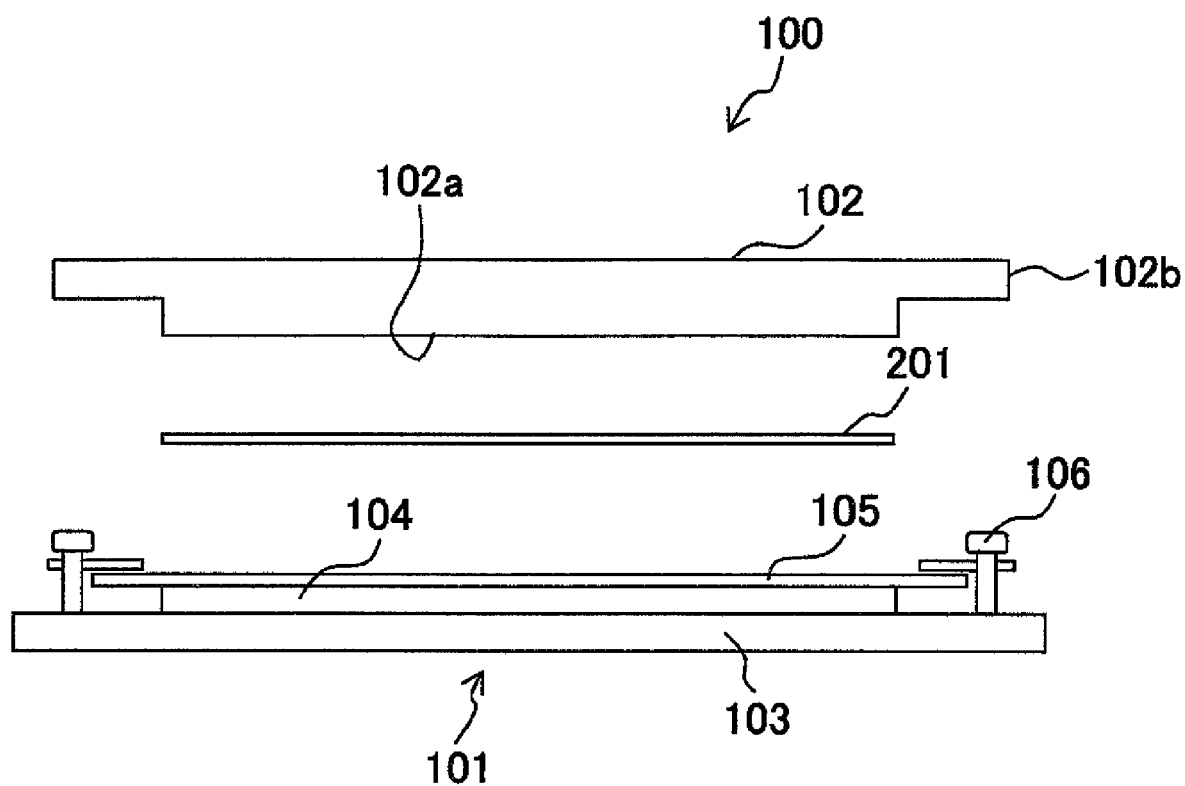
FIG. 1 is a schematic diagram of an imprinting jig according to the invention.

An embodiment of an imprinting jig according to the invention will be described with reference to FIG. 1. As shown in FIG. 1, an imprinting jig 100 mainly includes a stamper holder assembly 101, and a mirror plate 102 placed above the stamper holder assembly 101.

The mirror plate 102 is a substantially disk-shaped member made of stainless steel. A lower surface 102a of the mirror plate 102 facing the stamper holder assembly 101 is mirror finished. A flange 102b is provided around the periphery of the mirror plate 102. The flange has a smaller thickness than that of the central portion of the mirror plate 102. In handling the mirror plate 102, flange 102b may be gripped to prevent a careless contact with the mirror-finished lower surface 102a.

The stamper holder assembly 101 includes: a holder plate 103 that is a substantially disk-shaped member made of stainless steel; a rubber sheet 104 or an elastic member, made of heat-resisting rubber, placed on an upper surface of the holder plate 103 (on the side facing the mirror plate 102); a stamper 105 placed on an upper surface of the rubber sheet 104; and a clamp 106 (or hold portion, or peripheral hold portion) for fixing the rubber sheet 104 and the stamper 105 on an upper surface of the holder plate 103. The rubber sheet 104 is formed of silicon rubber, and placed between the stamper 105 and the holder plate 103. As described below, the rubber sheet 104 serves as a buffer during a heating and pressing process in production of optical disk substrates, so that the stamper 105 uniformly presses a whole plastic sheet having thermal plasticity to form an optical disk substrate.

The stamper 105 is a substantially disk-shaped thin member made of nickel, which has a surface formed with a predetermined fine pattern. In the heating and pressing process described below, the pattern is transferred onto a plastic sheet having thermal plasticity to form an optical disk substrate. The rubber sheet 104 and the stamper 105 are stacked and placed on the upper surface of the holder plate 103, and a peripheral portion of the stamper 105 is clamped by the clamp 106. Since the central portions of the rubber sheet 104 and the stamper 105 are not directly biased against the holder plate 103, the central portions may bend and be deformed so that the central portions leave away from the holder plate 103, as described below.

Figure 2:
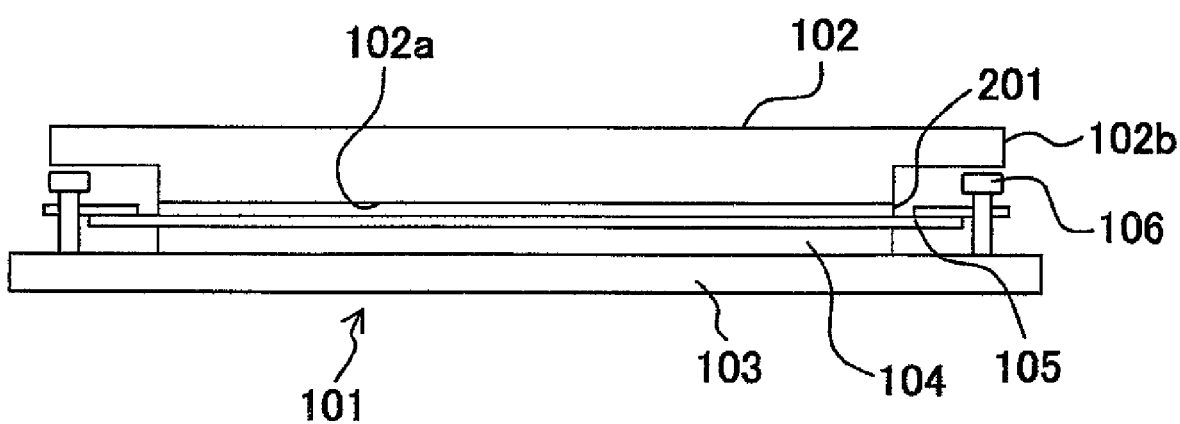
FIG. 2 is a schematic diagram showing a state in which a PC sheet is put in the imprinting jig.

Next, a process will be described in which the imprinting jig 100 described above is employed to form an optical disk substrate (which is referred to as "the sheet thermal nanoimprinting process"). First, as shown in FIG. 2, a plastic sheet having thermal plasticity (PC sheet) 201 formed of polycarbonate (PC) having a thickness of about 100 μm is placed on the upper surface of the stamper holder assembly 101, that is, on the upper surface of the stamper 105, the peripheral portion of which is fixed by the clamp 106 (on the surface with the pattern). Furthermore, the mirror-finished lower surface 102a of the mirror plate 102 is brought into contact with an upper surface of the PC sheet 201 to fix the PC sheet 201 in the imprinting jig 100.

Figure 3:
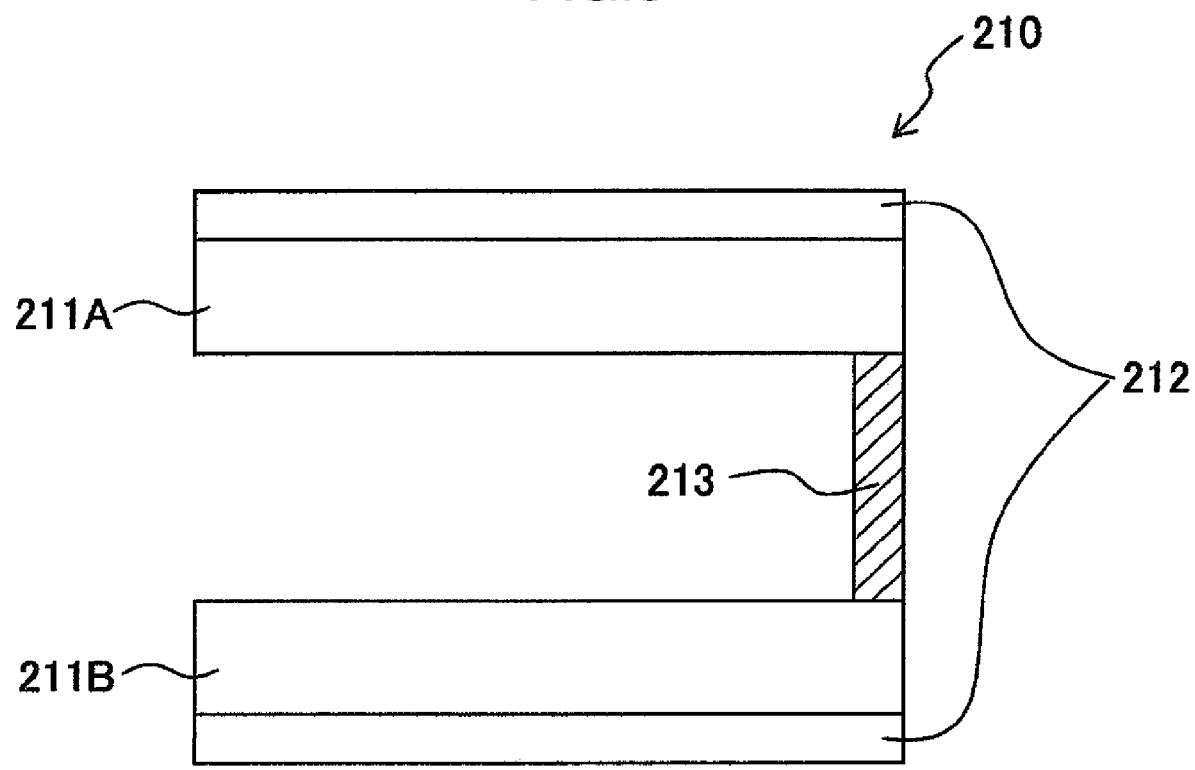
FIG. 3 is a schematic diagram of a pressing apparatus.
Figure 4A:
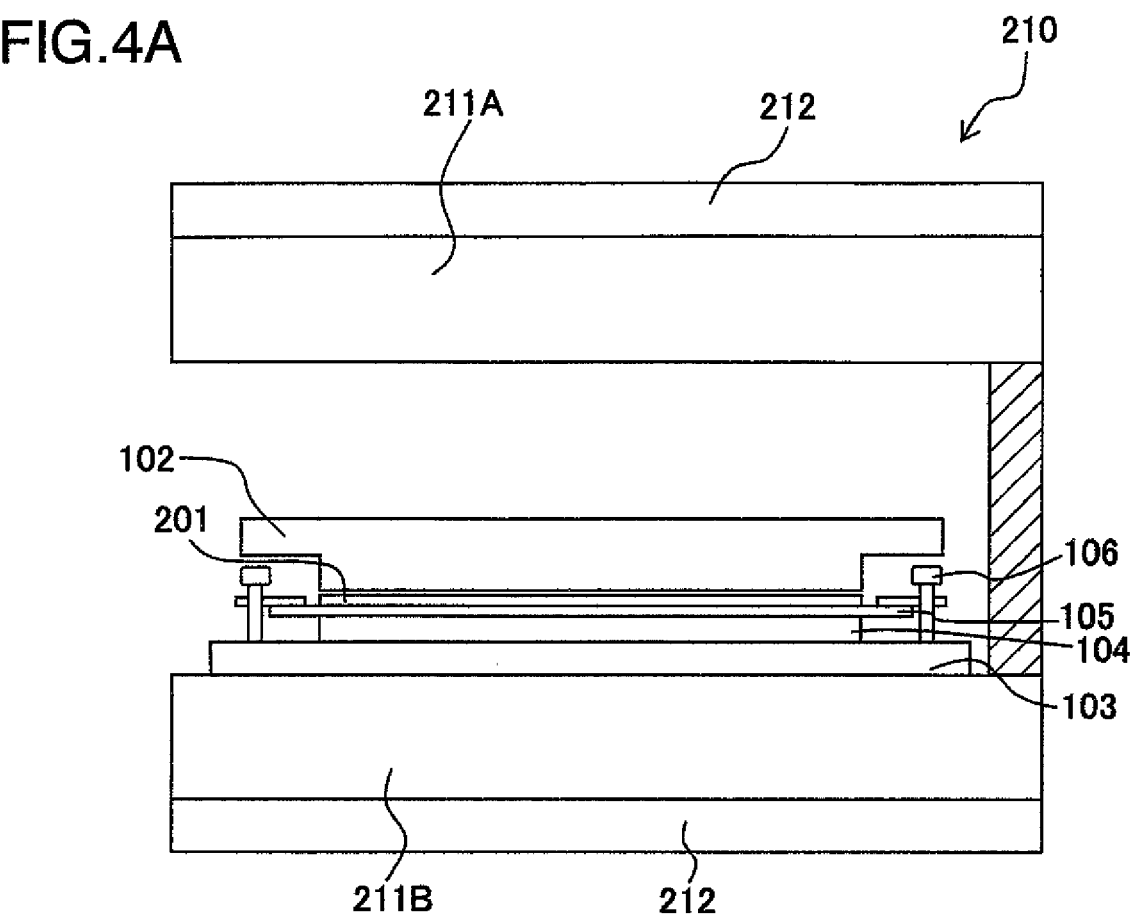
FIG. 4A is a schematic diagram showing a state in which the imprinting jig with the PC sheet is mounted on the pressing apparatus.

Then, as shown in FIG. 4A, the imprinting jig 100 sandwiching the PC sheet 201 is mounted on a pressing apparatus 210. As shown in FIG. 3, the pressing apparatus 210 includes: an upper stage 211A and a lower stage 211B having a predetermined thickness, which are plate-like members made of a metal; heaters 212 provided on the upper stage 211A and the lower stage 211B, respectively; a ball screw 213 rotatably provided in the upper stage 211A to move the upper stage 211A up and down; and a motor (not shown) for the ball screw 213 and accommodated in the lower stage 211B. The pressing apparatus 210 may press an object between the upper stage 211A and the lower stage 211B, with heating the object at a predetermined temperature by means of the heaters 212.

Figure 4B:
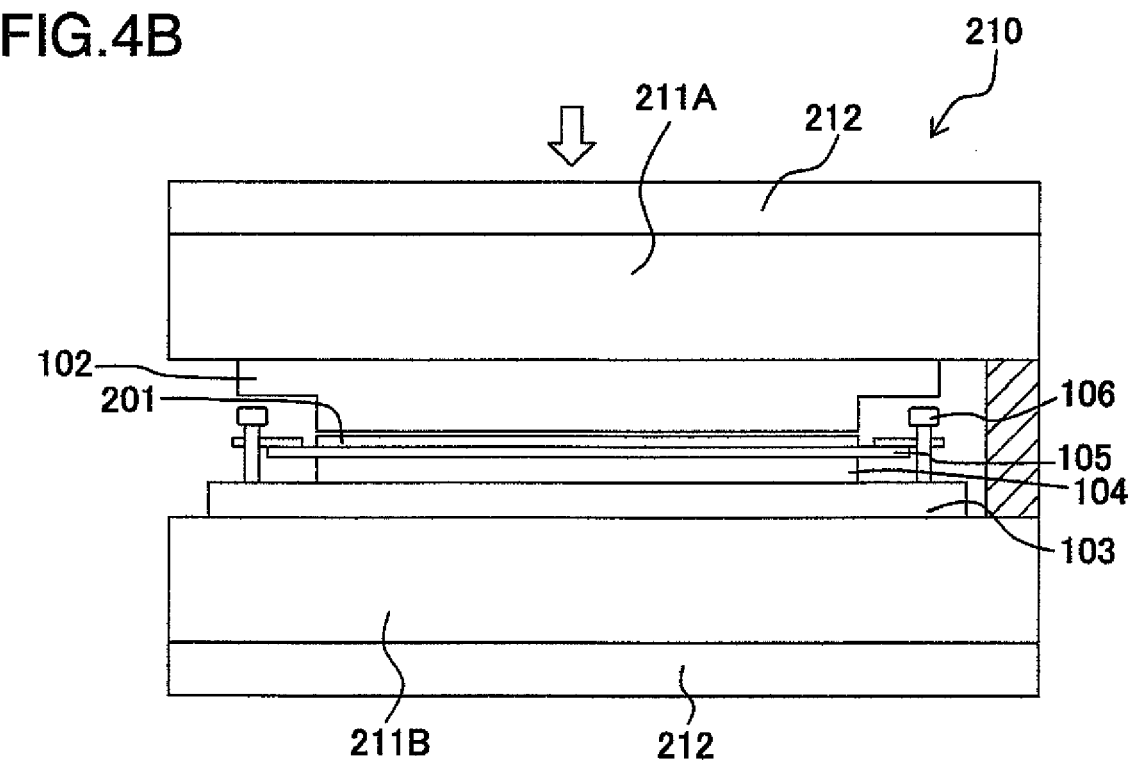
FIG. 4B is a schematic diagram showing a state in which the imprinting jig is pressed by the pressing apparatus.

The upper stage 211A, as shown in FIG. 4B, is moved in a direction toward the lower stage 211B with use of the motor for the ball screw 213 to apply a predetermined load to the imprinting jig 100 between the upper stage 211A and the lower stage 211B. The imprinting jig 100 is pressed with the predetermined load or pressure, and consequently the PC sheet 201 put in the imprinting jig 100 is also subjected to the predetermined load. While the pressing apparatus 210 presses the imprinting jig 100 and the PC sheet 201, the heaters 212 in the pressing apparatus 210 keep the imprinting jig 100 and the PC sheet 201 at a temperature higher than a glass transition temperature Tg of the PC sheet 201 (in the heating and pressing process). As described above, pressing of the PC sheet 201 at a temperature higher than the glass transition temperature Tg allows the predetermined pattern on the upper surface of the stamper 105 to be transferred onto a lower surface of the PC sheet 201 in contact with the upper surface of the stamper 105.

After the pressing apparatus 210 applies the predetermined load to the imprinting jig 100 and the PC sheet 201 for a predetermined period, e.g. for about 10 seconds in the embodiment, the upper stage 211A of the pressing apparatus 210 is separated from the lower stage 211B, and the imprinting jig 100 (and the PC sheet 201) between the stages is taken out. The imprinting jig 100 and the PC sheet 201 are cooled to a temperature lower than the glass transition temperature Tg of the PC sheet 201 (a cooling process). When the PC sheet 201 is cooled to a temperature sufficiently lower than the glass transition temperature Tg, the pattern transferred onto the PC sheet 201 may be easily damaged in a separating process described below. Thus, a cooling temperature is preferably kept at a temperature a little lower than the glass transition temperature Tg of the PC sheet 201.

Figure 5:
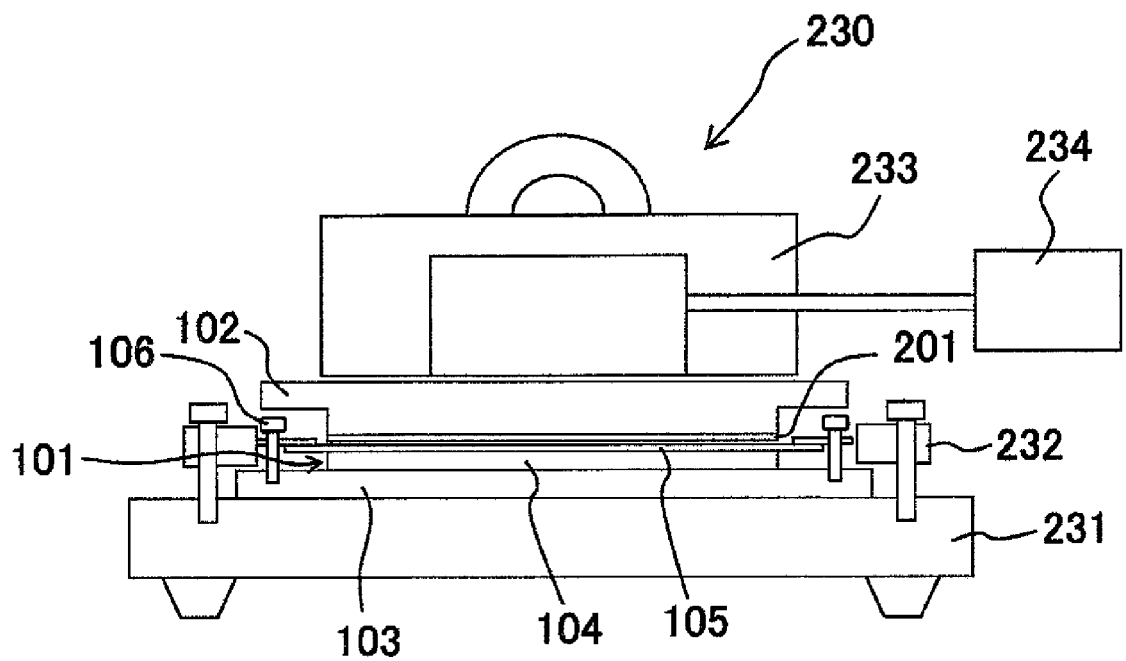
FIG. 5 is a schematic diagram showing a state in which the imprinting jig is mounted on a separating apparatus.

After the imprinting jig 100 and the PC sheet 201 are cooled to a predetermined temperature, they are mounted on a separating apparatus 230 as shown in FIG. 5. The separating apparatus 230 includes: a stage 231 for placing an object thereon; a clamp 232 for fixing the object placed on the stage 231; a vacuum-contacting portion 233 for vacuum-contacting the object fixed on the stage 231; a vacuum pump 234; and a moving portion 235 for moving up the vacuum-contacting portion 233 in relation to the stage 231. The vacuum-contacting portion 233 is placed to adhere to the object with forming a predetermined closed space between itself and the object. The vacuum pump 234 reduces a pressure in the space between the vacuum-contacting portion 233 and the object so that the vacuum-contacting portion 233 is vacuum-contacted to the object.

As shown in FIG. 5, the imprinting jig 100 is placed on the stage 231. The stamper holder assembly 101 of the imprinting jig 100 is fixed to the stage 231 by the clamp 232, and the vacuum-contacting portion 233 is vacuum-contacted to the upper surface of the mirror plate 102 of the imprinting jig 100. Subsequently, the vacuum-contacting portion 233 is moved up with respect to the stage 231 by means of the moving portion 235, and the mirror plate 102 is separated from the stamper holder assembly 101. During the step, the mirror plate 102 and the stamper holder assembly 101 are separated from each other while keeping substantially parallel to each other.

The PC sheet 201 is firmly adhered to the mirror plate 102 since the surface of the mirror plate 102 in contact with the PC sheet 201 is mirror finished. Consequently, if a force is applied in a direction vertical to the surfaces of the mirror plate 102 and the PC sheet 201, it is difficult to separate them from each other. Thus, at the time of pulling up the mirror plate 102 to which the vacuum-contacting portion 233 is vacuum-contacted, the mirror plate 102 does not separated from the PC sheet 201, and the mirror plate 102 and the PC sheet 201 are pulled up in one in relation to the stamper holder assembly 101.

On the other hand, when the mirror plate 102 to which the vacuum-contacting portion 233 is attached is pulled up as described above, the upper surface of the stamper holder assembly 101 (that is, the upper surface of the stamper 105) is separated from the lower surface of the PC sheet 201 since the stamper holder assembly 101 is fixed on the stage 231 (a separating process). Subsequently, the PC sheet 201 is separated from the mirror plate 102, and there is provided an optical disk substrate, on one of which surfaces the fine pattern is formed.

Between the mirror plate 102 and the stamper holder assembly 101 from which the PC sheet 201 has been separated is placed another PC sheet 201, and they are mounted again on the pressing apparatus 210. The imprinting jig 100 and the pressing apparatus 210 are independent apparatuses, and the imprinting jig 100 may be easily taken out from the pressing apparatus to cool the PC sheet 201 while keeping the pressing apparatus 210 at a predetermined temperature. Since the imprinting jig 100 has a small heat capacity, it can be cooled in a short time. Consequently, it is not necessary to wait for the pressing apparatus 210 having a large heat capacity to be cooled in the cooling process of the PC sheet 201, as contrasted to the case where the imprinting jig 100 is incorporated in the pressing apparatus 210. Furthermore, when a plurality of imprinting jigs 100 are used, the cooling process of the PC sheet 201 mounted on some imprinting jig 100 and the heating and pressing process of the PC sheet 201 mounted on another imprinting jig 100 using the pressing apparatus 210 kept at the predetermined temperature can be concurrently performed, and work time may be shortened.

Since the pressing apparatus 210 and the imprinting jig 100 are not integrated, however, the PC sheet 201 mounted on the imprinting jig 100 is not always pressed uniformly over the whole surface of PC sheet 201 even if the upper stage 211A and the lower stage 211B of the pressing apparatus 210 are formed with a high machining accuracy. It is because uniformity of the pressure applied to the PC sheet 201 is subjected to errors depends on a machining accuracy of the imprinting jig 100 (tolerance), an accuracy of attachment of the PC sheet 201 to the imprinting jig 100, and/or an accuracy of attachment of the imprinting jig 100 to the pressing apparatus 210. When the errors described above are large, and the PC sheet 201 is not uniformly pressed over the entire surface thereof, the upper surface of the stamper 105 and the lower surface of the PC sheet 201 may not uniformly contact to each other, and the fine pattern on the stamper 105 may not be transferred onto the lower surface of the PC sheet 201. In order to prevent this, the rubber sheet 104 for buffering may be placed between the holder plate 103 and the stamper 105 in the embodiment to absorb the errors described above, thereby the PC sheet 201 may be uniformly pressed entirely over the surface thereof.

While the PC sheet 201 is mounted on the imprinting jig 100, a predetermined fine pattern formed on the upper surface of the stamper 105 may be transferred onto the lower surface of the PC sheet 201 by pressing them with the pressing apparatus 210. Subsequently, when the imprinting jig 100 is taken out from the pressing apparatus 210, the PC sheet 201 and the imprinting jig 100 are adhered to each other, and they have to be separated from each other as described above. When the PC sheet 201 is separated from the stamper 105 of the imprinting jig 100, if a force tilted to a direction of the surfaces of the stamper 105 and the PC sheet 201 (hereinafter, referred to as merely "surface direction") may be applied to the stamper 105 or the PC sheet 201, as if a sticker is stripped, the pattern transferred onto the lower surface of the PC sheet 201 may be possibly damaged while they may be separated from each other. Furthermore, when a very large force may be applied to separate the stamper 105 and the PC sheet 201 from each other (peeling force), the peeled PC sheet 201 may be deformed.

Thus, it is desirably to separate the stamper 105 and the PC sheet 201 from each other while keeping them parallel to each other using a force as weak as possible, when the PC sheet 201 is separated from the stamper 105. The separating apparatus 230 is used for separation in the embodiment, and separation may be performed while keeping the stamper 105 and the PC sheet 201 parallel to each other. However, in order keep the stamper 105 and the PC sheet 201 parallel to each other during separation, it is necessary to apply to them with a force vertical to the surface direction for separation, and a larger peel force is required, compared with the case where a force tilted to the surface direction is applied to separate them from each other. If such a large peeling force is applied to the PC sheet, the separated PC sheet 201, as described above, may be deformed.

With respect to the problem, the inventors have found, based on the experimental results shown below, that the force required for separation (peeling force) largely vary depending on roughness (Ra) of the upper surface of the holder plate 103. That is, it has been found that the force required for separating the PC sheet 201 from the stamper 105 does not depend on surface roughness of a portion of the imprinting jig 100 in contact with the PC sheet 201, but on the surface roughness of a portion in contact with the rubber sheet 104. That is, it has been found that the peel force depends on adhesion between the holder plate 103 and the rubber sheet 104.

Experiments was performed in which the holder plate 103 having the upper surface having different surface roughness (Ra) and separation conditions were studied in separating the PC sheet 201 from the stamper 105 using the separating apparatus 230 described above. Table 1 shows the summary of the experimental results. From the results, it is understood that when Ra is small (when Ra is 20 nm or 400 nm), a very large peel force becomes necessary, and the PC sheet 201 cannot be separated from the stamper 105 using an existing separating apparatus. On the contrary, when Ra is large (for example, Ra is 600 nm or 1000 nm), a small peeling force may separate the PC sheet 201 from the stamper 105. That is, it is understood that an increase in the roughness (Ra) of the upper surface of the holder plate 103 allowed the stamper 105 and the PC sheet 201 to be separated from each other with a small peeling force.

TABLE 1

| surface roughness: Ra (nm) | Result of separation |
| --- | --- |
| 20 | impossible to separate by existing device |
| 400 | impossible to separate by existing device |
| 500 | possible to separate, but large peeling force is required |
| 600 | Possible to separate with small peeling force |
| 1000 | Possible to separate with small peeling force |

Next, an effect of the roughness of the upper surface of the holder plate 103 on the separation of the PC sheet 201 from the stamper 105 will be discussed. When the PC sheet 201 is separated from the stamper 105, the mirror plate 102 is pulled up in relation to the stamper holder assembly 101. At this time, the PC sheet 201 integrated with the mirror plate 102 will pull up the stamper 105. Although the peripheral portion of the stamper 105 is biased toward the holder plate 103 by the clamp 106, the central portions thereof are not directly biased toward the holder plate 103. Furthermore, the rubber sheet 104 adheres to the stamper 105, and they are firmly attached to each other. However, when the upper surface of the holder plate 103 is roughened with fine irregularity, adhesion between the holder plate 103 and the rubber sheet 104 becomes low. Then, it is conceivable that when a force is applied in a direction shown by the arrows shown in FIG. 6 by the separating apparatus 230 to separate the PC sheet 201 from the stamper 105, the stamper 105 and the rubber sheet 104 becomes integrated so that the central portions thereof are slightly deformed in an upwardly convex shape.

Figure 6:
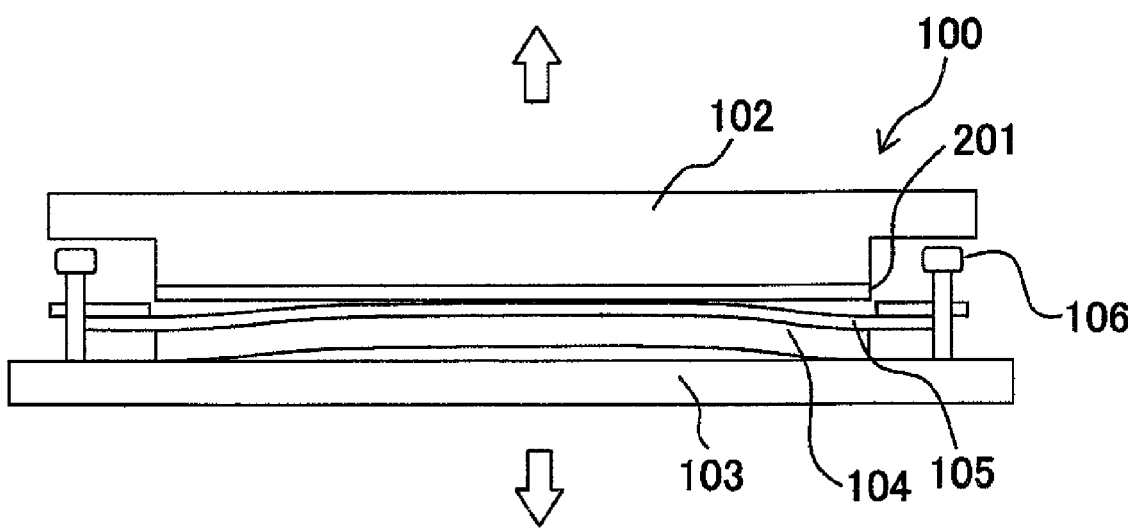
FIG. 6 is a schematic diagram showing a state of the imprinting jig when the PC sheet is separated from the stamper.

When the stamper 105 and the rubber sheet 104 are pulled up as shown in FIG. 6, the central portions thereof are slightly deformed in an upwardly convex shape, while the periphery portion of the stamper 105 is fixed on the holder plate 103 and is not deformed. Then, a small gap is generated between the periphery portion of the stamper 105 and the periphery portion of the PC sheet 201. It is thought that the gap may give a source to facilitate separation of the PC sheet 201 from the stamper 105. That is, it is thought that the formation of the gap may cause an equivalent effect as pulling the stamper 105 and the PC sheet 201 diagonally at a very little angle. Alternately, it is also thought that the formation of the gap may allow an air to be supplied into a contact surface (an interface) between the stamper 105 and the PC sheet 201 to facilitate separation thereof.

As described above, it is thought to be necessary that the central portion of the stamper 105 moves relative to the periphery portion of the stamper 105 in a direction in which the central portion of the stamper 105 is pulled away from the holder plate 103 in order to reduce the peeling force required for separation of the PC sheet 201 from the stamper 105. That is, it is necessary for the stamper 105 to be slightly deformed in an upwardly convex shape. A means for improving the separation of the PC sheet 201 from the stamper 105 is not limited to the formation of small irregularity (with Ra of about 600 nm to about 1 μm) on the surface of the holder plate 103 in contact with the rubber sheet 104, such as the means in the embodiment described above, but various means described below may be employed.

The inventors have found, based on the experimental results described above, that the force required for separation (peeling force) largely varies depending on the roughness (Ra) of the upper surface of the holder plate 103. That is, it has been found that the force required for separation of the PC sheet 201 from the stamper 105 depends on adhesion force between the rubber sheet 104 and the holder plate 103. As described above, focusing on the adhesion between the rubber sheet 104 and the holder plate 103, small irregularity (with Ra of about 600 nm to about 1 μm) may be formed on the surface of the rubber sheet 104 in contact with the holder plate 103 in addition to, or instead of, the formation of small irregularity (Ra is about 600 nm to about 1 μm) on the surface of the holder plate 103 in contact with the rubber sheet 104. The formation of the irregularity may reduce the adhesion force between the rubber sheet 104 and the holder plate 103. In this case, when the PC sheet 201 is separated from the stamper 105, the central portions of the rubber sheet 104 and the stamper 105 may be deformed in an upwardly convex shape, and separation of the PC sheet 201 from the stamper 105 may be facilitated because of the reason described above.

Figure 7:
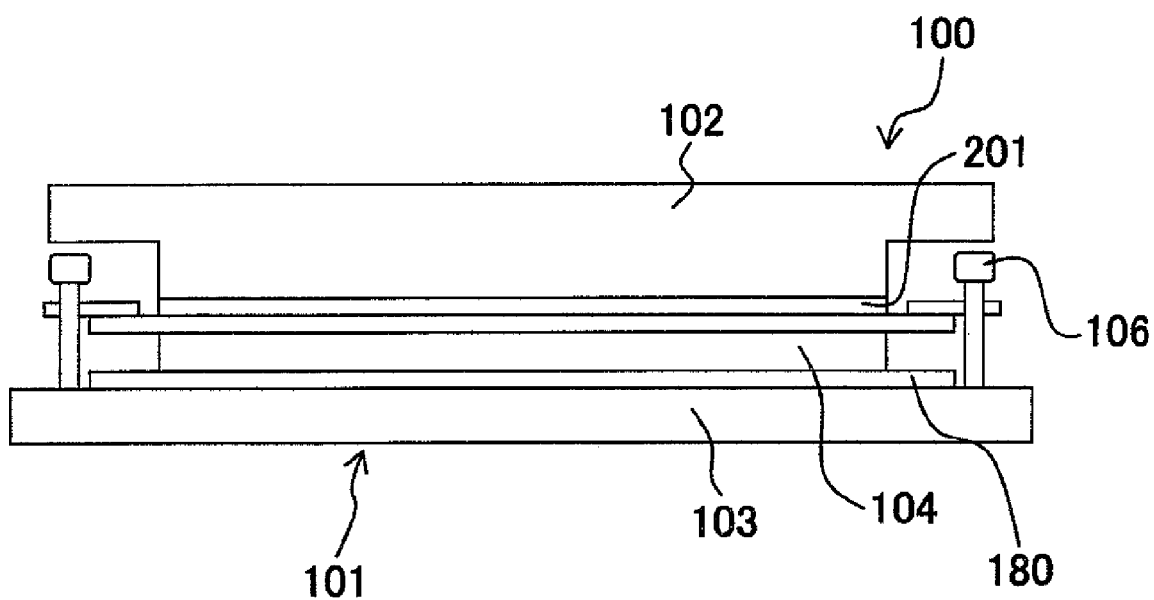
FIG. 7 is a schematic diagram of the imprinting jig with a release agent.

As shown in FIG. 7, a release agent 180 may be applied between the rubber sheet 104 and the holder plate 103. In this case, separation of the rubber sheet 104 from the holder plate 103 may be also facilitated, and when the PC sheet 201 is separated from the stamper 105, the central portions of the rubber sheet 104 and the stamper 105 may be deformed in an upwardly convex shape. Then, the separation of the PC sheet 201 from the stamper 105 may be easily carried out. Also, in addition to, or instead of, the application of the release agent 180, a thin film, such as fluorine resin, a metal thin film having a surface or surfaces on which fine irregularity is formed, or the like may be placed between the rubber sheet 104 and the holder plate 103, and thereby the separation of the PC sheet 201 from the stamper 105 may be also facilitated.

Figure 8:
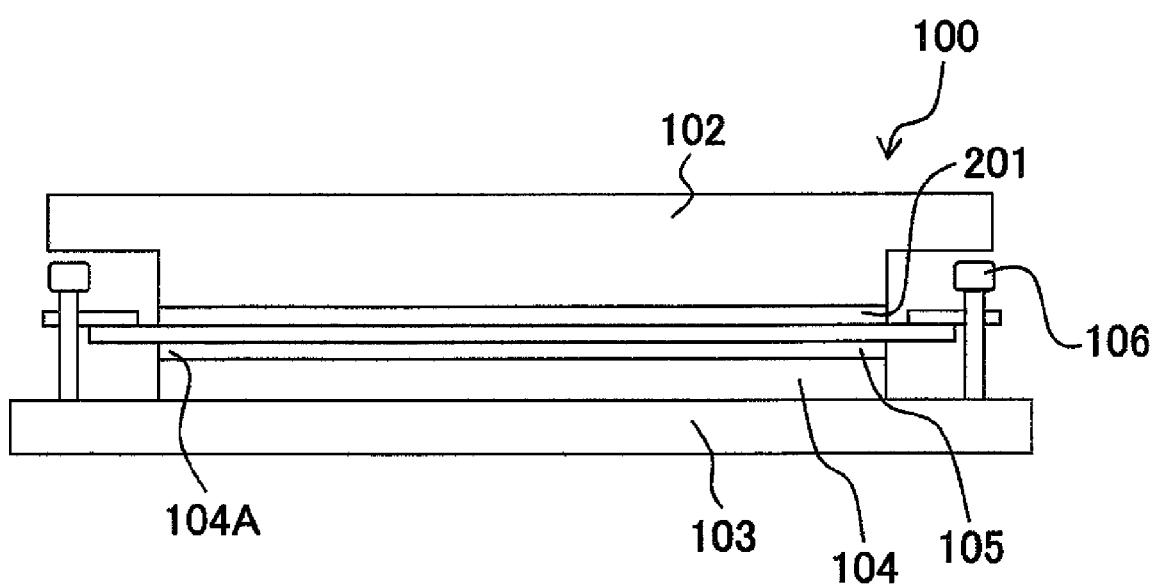
FIG. 8 is a schematic diagram of the imprinting jig with two rubber sheets.

As shown in FIG. 8, another rubber sheet 104A may be further placed between the rubber sheet 104 and the holder plate 103. In this case, fine irregularity may be formed on a surface of the rubber sheet 104 and/or the rubber sheet 104A, and a release agent 180 may be applied between these rubber sheets. Alternatively, the thin films described above may be inserted between these rubber sheets. In each case, the separation of the PC sheet 201 from the stamper 105 may be also facilitated.

Hitherto, the cases have been described where the separation of the PC sheet 201 from the stamper 105 is facilitated by the means for reducing the adhesion between the contacting surfaces of the rubber sheet 104 and the holder plate 103. However, the means described above may be applied between the stamper 105 and the rubber sheet 104, and thereby the adhesion therebetween may be reduced. In this case, the rubber sheet 104 may be adhered to the holder plate 103, but the central portion of the stamper 105 may be pulled away from the rubber sheet 104 to be deformed in an upwardly convex shape, and thus, the separation of the PC sheet 201 from the stamper 105 may be facilitated.

The irregularity formed on the rubber sheet 104, the holder plate 103 or the stamper 105 stated above may be formed over the entire surfaces thereof, or on a part of the central portions thereof, for example. Furthermore, the irregularity may be formed on two or more surfaces, for example, on both surfaces of the rubber sheet 104. Furthermore, material of the rubber sheet 104 is not limited to silicon rubber, but may be rubber having thermal resistance such as fluorinated rubber or Viton. In addition, the rubber sheet 104A may be of the same material as the rubber sheet 104, or formed of another material having thermal resistance.

Furthermore, the holder plate, the mirror plate and the like are not limited to the shape and the material in the embodiments described above. For example, a fine pattern in a nano-level similar to that of the stamper may be formed on the surface of the mirror plate in contact with the PC sheet. The embodiments have been described above referring to the PC sheet as an example for raw material for forming an optical disk substrate, but the raw material may be a plastic sheet having thermal plasticity, for example, a PET sheet.

The specific embodiments of the invention have been described above, but the invention is not limited to the embodiments. Those skilled in the art may make various modifications and changes to the configuration and the function of the invention without departing from the spirit of the invention and the scope of the claims.

The invention claimed is:

1. An imprinting jig comprising:
a first die having a surface with a pattern for transferring the pattern onto a thermoplastic sheet;
a die holder for supporting the first die;
an elastic member placed between the first die and the die holder; and
a second die opposing to the first die, wherein the sheet is placed on the surface with the pattern of the first die, and wherein an adhesion reducing means is provided between the elastic member and the first die or between the elastic member and the die holder, the adhesion reducing means comprising irregularity on one or both of opposite surfaces of the elastic member and the die holder, or irregularity on a surface of the elastic member facing the first die.

2. The imprinting jig according to claim 1, wherein the irregularity has a height of about 1 μm.

* * * * *